United States Patent [19]

Lee et al.

[11] Patent Number: 4,697,250
[45] Date of Patent: Sep. 29, 1987

[54] FLEXIBLE COMPUTER CONTROL UNIT

[75] Inventors: Hsiao-Peng S. Lee, Sunnyvale; Ulrich Spannagel, Los Altos, both of Calif.

[73] Assignee: Amdahl Corporation, Sunnyvale, Calif.

[21] Appl. No.: 876,302

[22] Filed: Jun. 18, 1986

Related U.S. Application Data

[63] Continuation of Ser. No. 790,270, Oct. 22, 1985, abandoned, which is a continuation of Ser. No. 525,745, Aug. 22, 1983, abandoned.

[51] Int. Cl.⁴ .............................................. G06F 9/02
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,764,988 | 10/1973 | Onishi | 364/200 |
| 3,812,464 | 5/1974 | Collina | 364/200 |
| 3,868,649 | 2/1975 | Sato et al. | 364/200 |
| 3,875,447 | 3/1975 | Tessera | 364/200 |
| 3,878,514 | 4/1975 | Faber | 364/200 |
| 3,889,242 | 6/1975 | Malmer | 364/200 |
| 3,956,738 | 5/1976 | Tessera | 364/200 |
| 4,080,648 | 3/1978 | Asano et al. | 364/200 |
| 4,145,736 | 3/1979 | Yamada et al. | 364/200 |
| 4,307,445 | 12/1981 | Tredennick | 364/200 |
| 4,399,505 | 8/1983 | Druke | 364/200 |
| 4,450,524 | 5/1984 | Oberman | 364/200 |

*Primary Examiner*—Raulfe B. Zache
*Assistant Examiner*—Florin Munteanu
*Attorney, Agent, or Firm*—Fliesler, Dubb, Meyer & Lovejoy

[57] ABSTRACT

Disclosed is a control unit including a flexible decoder unit providing control patterns for controlling functional units in data processing equipment. The control unit includes hardwired decoder logic which decodes a multi-bit key to provide primary decoded outputs as control patterns. The decoder unit also decodes one or more alternate decoded outputs for future use. The decoder includes a plurality of flexibility inputs which, when connected to an alternate decoded output, provide new control patterns and thus provides flexibility to the hardwired decoder. Because of the flexibility, the control patterns formed by the hardwired decoder can be readily changed. The flexible hardwired decoder is of great value, therefore, when design changes are desired in a computer.

6 Claims, 5 Drawing Figures

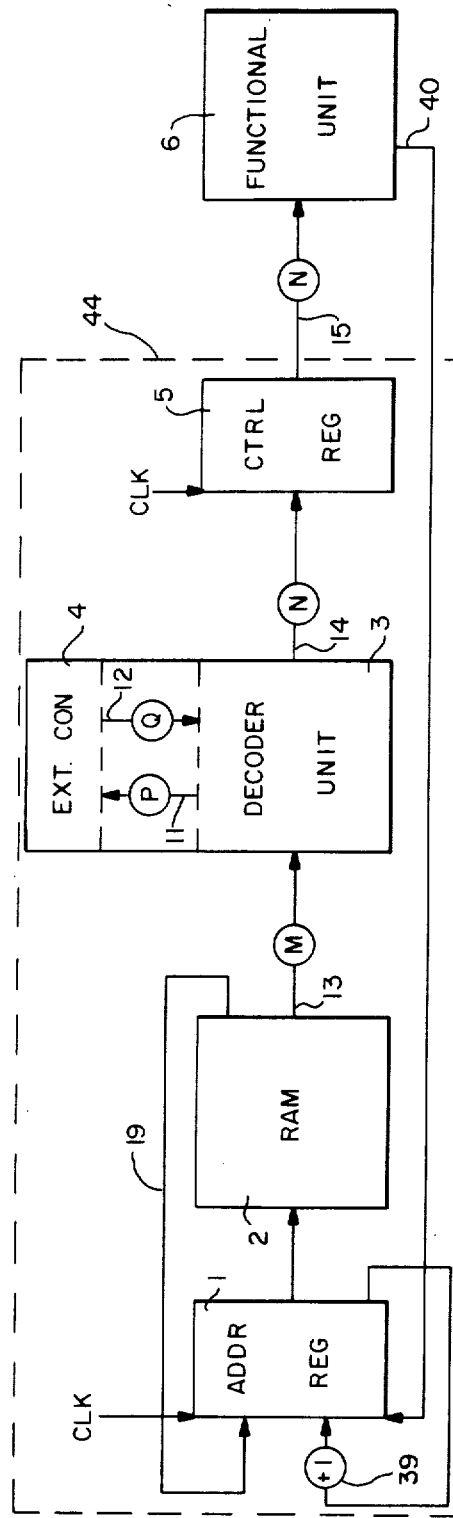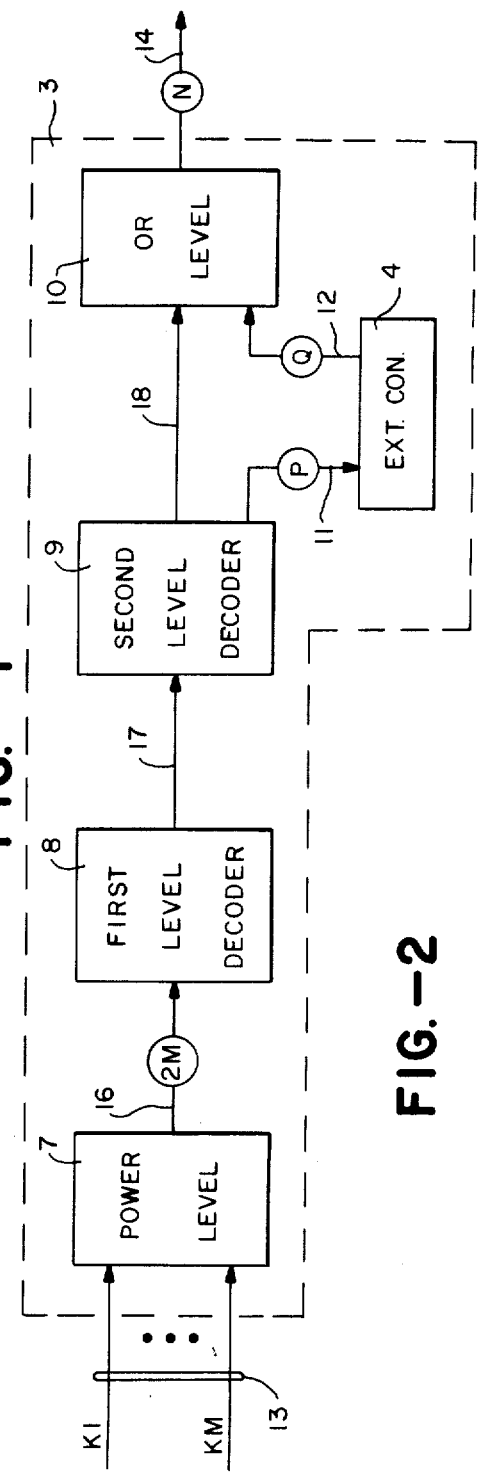
FIG.-1
FIG.-2

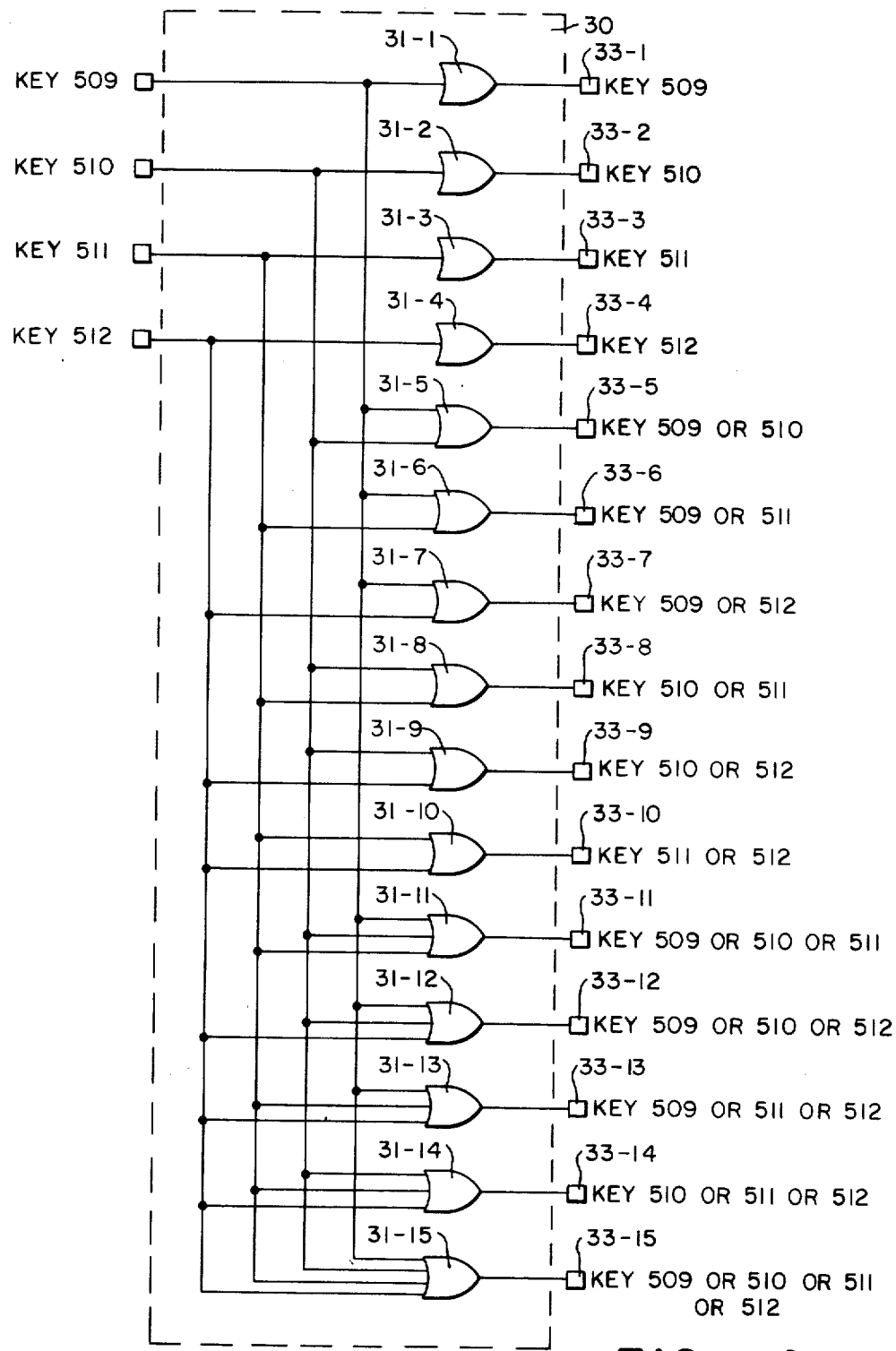
FIG.—4

FLEXIBLE COMPUTER CONTROL UNIT

This is a continuation of Ser. No. 1,790,270 filed Oct. 22, 1985, now abondoned, which is a continuation of Ser. No. 525,745 filed Aug. 22, 1983, now abandoned.

BACKGROUND

The present invention relates to the field of computers and, more particularly, to the field of control units and decoders utilized for controlling computers.

In computer systems, a control unit generates a large number of control signals to control the system or functional blocks within the system. The control unit typically includes a decoder unit for providing the control signals.

The control unit sometimes includes hardwired logic and sometimes includes a microprogrammed control store. Hardwired logic units can be cheaper in cost while microprogrammed control stores have greater flexibility.

Microprogrammed control stores operate by having control signals, sometimes called control patterns, read out directly from the control store. Since the contents of the control patterns can be easily changed, a control store provides flexibility whenever the control functions to be performed are to be changed. However, the cost of a control store can be high due to the amount of control memory required to store the control patterns.

Hardwired control logic can provide control patterns using the fewest number of circuits and therefore can have lower cost. However, hardwired logic has the problem of inflexibility. When it is desirable to change the design of hardwired control logic, the design changes are often expensive and time consuming, particularly when the logic is embedded in semiconductor chips. The development stage of a computer using hardwired control logic is difficult because many changes in the control logic occur at this time. Also, after the development stage when the final design is achieved and the product is ready for manufacture, frequently still additional changes are made. These changes either correct previously undetected problems or provide new functions not previously planned. Such changes in the past have proved expensive, difficult to make and time consuming for hardwired decoder units.

In order to overcome the inflexibility of hardwired logic, microprogram control stores are usually preferred because of their flexibility even though they are more expensive than hardwired decoder units.

In accordance with the above background, there is a need for improved control units and decoder units which are low cost and highly flexible.

SUMMARY OF THE INVENTION

The present invention is a control unit including a flexible decoder unit providing control patterns for controlling functional units in data processing equipment. The control unit includes hardwired decoder logic which decodes a multi-bit key to provide primary decoded outputs as control patterns. The decoder unit also decodes one or more alternate decoded outputs for future use. The decoder includes a plurality of flexiblity inputs which, when connected to an alternate decoded output, provide new control patterns and thus provides flexibility to the hardwired decoder. Because of the flexibility, the control patterns formed by the hardwired decoder can be readily changed. The flexible hardwired decoder is of great value, therefore, when design changes are desired in a computer.

The control unit of the present invention includes a flexible hardwired decoder and a random access memory for storing control information such as a microprogram. The memory sequentially supplies M-bit keys to the hardwired decoder. Each time a key is presented, the hardwired decoder decodes the key and provides N output bits which are latched into a control register to form the binary control pattern. The control pattern is distributed to functional units to control the data processing system. To change the control pattern, one or more of the alternate decoded outputs are connected to one or more of the flexibility inputs. The flexibility inputs are typicallly connected into each OR gate in the final output stage of the hardwired logic. With these connections, any one of $2^N$ different control patterns can be added to the hardwired logic. In this manner, control of the computer can be changed. A maximum of $2^M$ control patterns (from a possible $2^N$) can be decoded.

The foregoing and other objects, features and advantages of the invention will be apparent from the following more detailed description of preferred embodiments of the invention as illustrated in the accompanying drawings.

BRIEF DESCRIPTION OF THE DRAWINGS

FIG. 1 depicts a schematic block diagram of a control unit connected in a computer or other data processing system for controlling the operation of the system.

FIG. 2 depicts a schematic block diagram of a decoder unit used in the FIG. 1 system.

FIG. 4 depicts an OR array for use in the decoder of FIGS. 2 and 3 to provide OR'ed combinations of alternate decoded outputs.

DETAILED DESCRIPTION

Control Unit—FIG. 1

Figure 3:
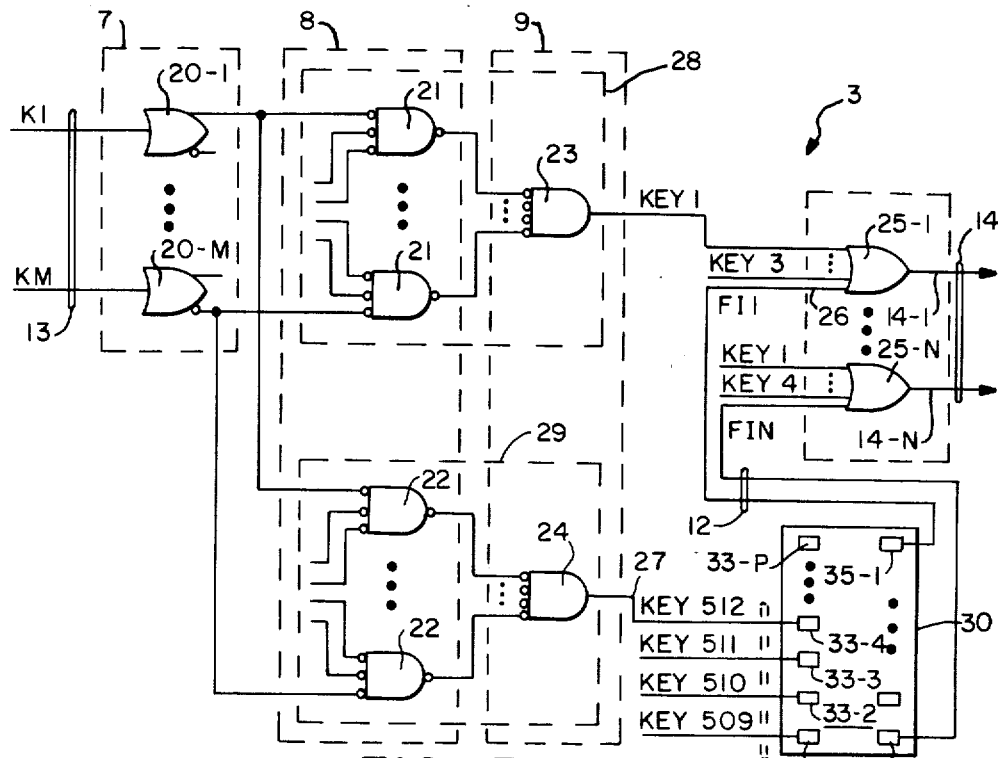
FIG. 3 depicts a schematic logic diagram of the decoder unit of FIG. 2.

In FIG. 1, a control unit 44 includes a decoder unit 3 which receives an M-bit key (k1, k2, . . . ,km) on the bus 13 from the random access memory 2. Decoder unit 3 provides the N-bit binary control pattern to the control register 5. Control register 5 supplies the binary control pattern to functional unit 6.

Random access memory 2, address register 1, decoder unit 3 and control register 5 form the control unit 44. The control unit 44 together with the functional unit 6 typically form a computer or some subunit within a computer.

In FIG. 1, the output on bus 19 from the memory 2 is the next address to be used to address memory 2. The address register 1 is loaded either from bus 19 or incremented by +1 through incrementer 39. The loading of register 1 is under control of control line 40 from unit 6 which in turn is controlled by the control pattern in the control register 5.

The memory 2 contains a microprogram which defines sequences of control patterns to be loaded into control register 5 to control the functional unit 6. Each microprogram word includes two parts, a next address field and one or more key fields. The key field or fields connect as an input to decoder unit 3. The next address field connects through bus 19 as an input to the address register 1. The key field or fields on bus 13 are decoded by the decoder unit 3 to provide a unique N-bit control pattern to be latched into the control register 5.

The FIG. 1 system is controlled by a clock signal (CLK) in a conventional manner. During each cycle, the address in register 1 addresses memory 2 which in turn provides the next address to register 1 and the next control pattern to register 5. At the end of the cycle, the next address is clocked into register 1 and the control pattern is clocked into register 5.

Each step of the microprogram provides a control pattern by identifying the key or keys to that pattern. Modifying a microprogram step amounts to replacing one key for one pattern by the key of a new pattern. If this new pattern is already defined, no change to the decoder is needed. This type of change accounts for many microprogram changes. If the new control pattern is not defined, a new key must be assigned to this new pattern and the decoder must be modified to decode this new key.

The decoder unit 3 also provides P alternate decoded outputs to an external connector 4. External connector 4 provides Q flexibility inputs to the decoder unit 3.

Typically, Q equals N. The function of the external connector 4 is to connect one or more of the P alternate decoded outputs to one or more of the Q flexibility inputs. In this way, the N-bit output to the control register 5 can be modified according to the connections made in the external connector 4.

Only a small subset of all possible combinations of control patterns are utilized in a system. The key is assigned to each defined combination to take advantage of this characteristic. The control patterns in control register 5 consist of N binary bits. The M-bit (k1, k2, . . . , km) key generally has fewer bits than the N-bit control pattern. By storing the M-bit key in memory 2 instead of the N-bit control pattern, the size of memory 2 is reduced significantly.

In one example of a system, the control pattern has 99 bits. N equals 99. Also, at most 512 different control patterns are employed in the system. The 512 control patterns are defined by a nine-bit key (k1, k2, . . . , k9). M equals 9. Key bits are decoded to specify one of up to 512 different patterns. Since there are 99 bits in the control pattern, the total number of possible control patterns is $2^{99}$. Only 512 of the $2^{99}$ patterns can be specified by the 9-bit key.

In an example where 1000 (1k) control store words are implemented, storage of the encoded key bits k1 through k9 requires 9000 bits (9k) in memory 2. However, if the 99-bit control patterns were actually stored in the memory 2 instead of the 9 bit keys, 99,000 bits (99k) of storage would be required. By storing only the 9-bit keys rather than the 99-bit control patterns, 90k bits of storage are saved. The cost of the decoder for decoding the 9-bit key into the 99 bit control pattern is generally much smaller than the cost of additional memory to store the 99-bit control patterns. In order that the accessing and the decoding of the keys can be carried out in the same clock cycle, the decoder is hardwired.

If the hardwired decoder does not have the flexibility features of the present inventions, only preassigned keys and their decoded control patterns are possible. If a new key (and new control pattern) is to be added, then the decoder must be remanufactured to accommodate this new key unless the new control patterns were anticipated and designed as spares into the decoder. Such anticipation is difficult. Furthermore, it is not practical to design all possible decodes into a decoder, since only a small percentage of all possible decodes are actually needed. In the example given, only 512 or fewer of the possible $2^{99}$ control patterns are actually employed.

When a decoder is implemented in LSI chips, costly and time-consuming chip redesign and remanufacture is required to implement any control pattern change unless the flexibility features of the present invention are employed.

In the present invention, the need for decoder chip redesigns are reduced since changes can be made on interchip connections located external to the chip and typically on the multi-chip carrier (MCC). Such changes can be made easily and quickly.

The basic decoder chip is modified to include the following:

(1) For each control pattern bit generated by a decoder chip, an extra input called a Flexibility Input, is added as an off-chip connection to the OR gate that produces the control pattern bit.

(2) One or more keys, initially unused, are decoded and connected to an output terminal to form alternate decoded outputs available for future use.

When a new control pattern is required, the alternate decoded output of the unused but decoded key is externally connected to the flexibility input of each control pattern bit that should be turned "on" in the new control pattern.

The connections from the unused alternate decoded key outputs to the flexibility inputs are made external to the chips and require only discrete wire additions to the MCC.

The designer of the microprogram and the chips can vary the number of alternate decoded outputs for unused keys. If the unused decoded keys become exhausted due to several design changes, a redesign of the decoder chip must take place and such redesign can absorb all the previous changes. At that time, new unused keys can again be included to provide for any future changes.

Decoder Unit—FIG. 2

In FIG. 2, a schematic representation of the decoder unit 3 of FIG. 1 is shown. The decoder unit 3 includes a power level 7, a first-level decoder 8, a second-level decoder 9 and an OR-level 10. The power level 7 receives the M-bit key (k1, k2, . . . ,kM) on the bus 13. The power level 7 phase splits the M-input signals to form 2M signals which then are selectively used in the first-level decoder 8. The first-level decoder 8 selects predetermined combinations of the 2M signals from the power level 7 to provide partially decoded signals on lines 17 to the second level decoder 9.

The second-level decoder 9 in turn selects predetermined combinations of these partially decoded signals to provide the decoded signals on lines 18. The OR level 10 combines the outputs of the second level decoder 9 to provide the N output control signals.

In FIG. 2, the output from the second-level decoder 9 includes the P alternate decoded outputs 11 which connect to the external connector 4. The external connector 4 also provides the Q flexibility inputs 12 to the OR level 10.

Decoder Unit Detail—FIG. 3

In a typical large scale integration (LSI) embodiment, the alternate decode lines 11 are sent to off-chip terminals 33-1, 33-2, . . . , 33-P. The flexibility lines 12 are inputs from the off-chip terminals 35-1, 35-2, . . . , 35-N to the OR gates 25-1, . . . , 25-N. Connections can be made between selected members of the lines 11 and selected members of the lines 12 using discrete connection wires between the off-chip terminals 33-1, 33-2, . . . ,33-P and 35-1, 35-2, . . . , 35-N.

In FIG. 3, further details of a particular design of the decoder unit 3 of FIG. 2 are shown. The power level 7 includes the M gates 20-1, . . . , 20-M where each gate develops the true and complement signal for the respective input signals k1, k2, . . . , kM. The first-level decoder 8 includes a first group of gates 21 which receive selected combinations of the outputs from gates 20-1 through 20-M. The gates 21 in turn provide their outputs as inputs to the second level decoder 9. Second-level decoder 9 includes a representative gate 23 which combines selected outputs from the gates 21. The output from gate 23 represents a final decode of one key. The gates 21 and 23 are representative of one key decode block 28 which decodes KEY1, one of the possible $2^M$ keys. Many similar combinations of gates like gates 21 and 23 form other blocks to decode other ones of the $2^M$ keys. For example, block 29 decodes KEY512, another one of the $2^M$ keys. Key 512 is one of the alternate keys which is initially unused and which connects on line 27 to an off-chip terminal 33-4.

The key bits are first partially decoded by the first level decode gates such as 21 and 22. In this particular design, the first three key bits are partially decoded by a group of gates and the next three key bits are partially decoded by a different group of gates. This continues until the key bits are exhausted. The second level decoder 9 completely decodes the key.

The partitioning of the decoder into a first level 8 and into a second level 9 is merely based on the decoder design approach. In the example described, decoded outputs are presented as fundamental products of the key. Of course, the outputs can also include implicants of the key.

In FIG. 3, the decoded output KEY1 from gate 23 is shown as typical and is connected as an input to any selected ones of the OR gates 25-1 to 25-N which in turn provide the N output signals on line 14 to the control register 5 of FIG. 1. Each OR gate 25-1 to 25-N which is connected to gate 23 will provide a logical "1" and each OR gate which is not connected will provide a logical "0" whenever KEY1 is decoded.

The OR gate 25-1 also receives KEY3 input from a key decode block (not shown) like block 28 so that line 14-1 will be a logical "1" whenever KEY1 or KEY3 is decoded. The OR gate 25-1 also receives inputs from any other key decode blocks which require that bit line 14-1 be energized when that particular key is decoded. OR gate 25-1 includes one of the flexibility inputs F11, on line 26 from the off-chip terminal 35-1 in external connector 4. If the terminal 35-1 and input line 26 are not connected to an alternate decoded key, then the output from OR gate 25-1 is not energized by the decode of any alternate key. If the terminal 35-1 and the flexible input line 26 are connected, as shown to terminal 33-4, then the output on line 14-1 from gate 25-1 is a logical "1" when KEY512 is decoded.

In FIG. 3, the first-level decoder gates 22 are similar to the gates 21. The gate 24 in the second-level decoder 9 is similar to the gate 23. Together gates 22 and 24 form decode block 29 which provides on line 27 the KEY512 decode, one of the lines in bus 11. In one example, the external connector 4 connects the line 27 to the line 26 in the embodiment of FIG. 3. Combinations similar to decoding gates 22 and 24 can be provided by other alternate decode lines 11.

In FIG. 3, the control pattern output from the decoder unit 3 is changed as a function of the external connection made in the connector 4 between terminals 33-1, 33-2, . . . ,33-P and terminals 35-1, . . . , 35-N. The external connection in connector 4 provides the ability to make changes in the hardwired decoder. Such changes are important when the decoder unit 3 is used as part of a computer or other data processing system in which control pattern changes are made from time to time.

OR Array—FIG. 4

When more than one unused key is decoded for later assignments to new control patterns, it is desirable to provide various OR'ing combinations of these keys to the decoder chip outputs. This OR'ing eliminates off chip OR'ing of the decoded keys when more than one key must turn "on" a particular bit in a new control pattern.

The OR gates in FIG. 4 are used to form various combinations of the alternate decoded keys, like KEY512 in FIG. 3. For example, if the keys KEY509, KEY510, KEY511, KEY512 are decoded as alternate keys in the FIG. 3 device, the OR'ed combinations of those alternate decoded keys are provided as indicated in FIG. 4. More specifically, the alternate decoded KEY509 connects through the gate 31-1 to an off-chip terminal 33-1. Whenever the KEY509 is to be connected as an input to one of the flexibility inputs in the external connector 4, a wire is connected from terminal 33-1 to the appropriate one of the terminals for the flexibility input in connector 4.

If the alternate key decode KEY509 and the alternate key decode KEY511 are to be connected to the same flexibility input, then the terminal 33-6 from the OR gate 31-6 is connected to the desired flexibility input in the external connector 4. It is apparent that any logical combination of the alternate keys, KEY509 through KEY512 can be connected to the same flexibility input. The OR structure of FIG. 4 permits alternate keys to be combined before connection to a terminal external to a chip. In this way, the need for logically combining signals external to the chips can be avoided. The only connections which are required to be made are jumper connections between a decoded key terminal and a flexibility input terminal. In this way, the signal delays and complexities encountered in extensive off-chip connections are kept to a minimum.

Figure 5:
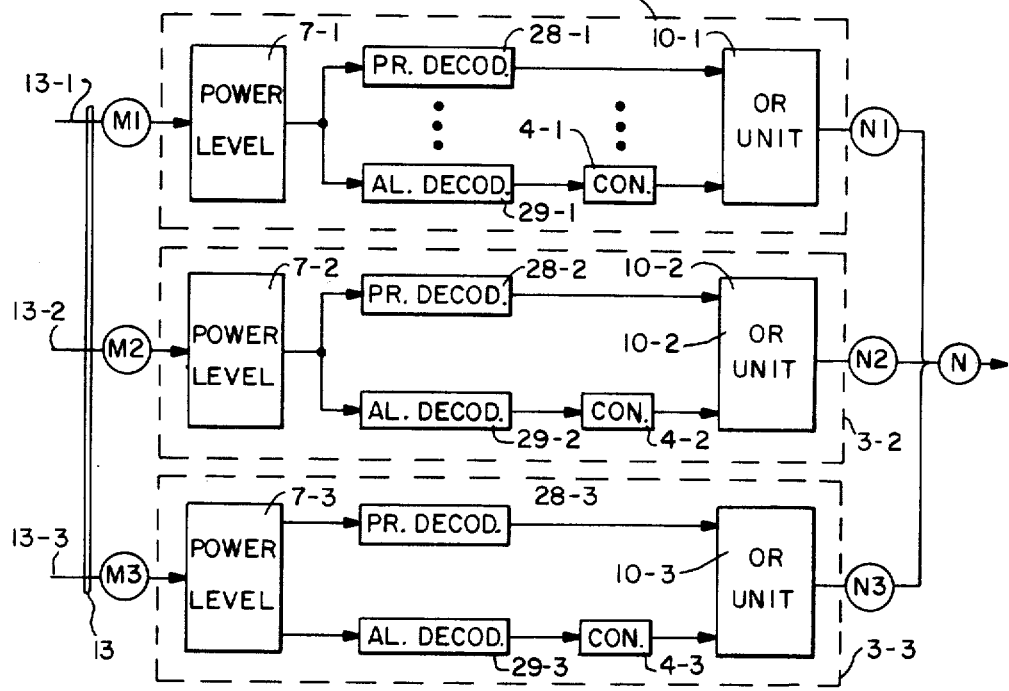
FIG. 5 depicts multiple-key embodiment of a decoder unit.

Multi-Key Decoder—FIG. 5

In FIG. 5, an alternate embodiment of the decoder unit 3 of FIG. 1 is shown. The decoder unit 3 of FIG. 5 differs from the decoder units of FIGS. 2 and 3 in that rather than a single encoded M-bit input key, as appears on lines 13 of FIG. 2, the FIG. 5 embodiment includes three separate keys having M1, M2 and M3 bits on input lines 13-1, 13-2 and 13-3, respectively. In FIG. 5 the sum of M1, M2 and M3 typically is greater than M in FIG. 1. In one example, M1, M2, and M3 are 4 bits, 7 bits and 5 bits for a total of 16 bits.

With this structure each entry in the microprogram in the memory 2 includes four fields, namely, the next address field, the M1 key field, the M2 key field and the M3 key field. Accordingly the output lines 13 from the memory 2 of FIG. 1 are divided into three groups of encoded key lines, namely lines 13-1, 13-2 and 13-3. The lines 13-1, 13-2 and 13-3 connect as inputs to decoder units 3-1, 3-2 and 3-3, respectively.

Each of the decoder units 3-1, 3-2 and 3-3 are analogous to the decoder unit 3 of FIGS. 2 and 3. Each decoder unit includes a power level 7-1, 7-2 and 7-3 respectively. The power levels in turn provide the signals to the groups of decoders. For example, in the control unit 3-1 the power level 7-1 supplies encoded key inputs to a key decoder 28-1 which is analogous to the key decoder 28 in FIG. 3. Similarly, an alternate key decoder 29-1 in FIG. 5 corresponds to the alternate decoder 29 of FIG. 3. The key decoded outputs from the decoders 28-1 and 29-1 are selectively connected to the OR unit 10-1 to provide the first N1 bits of the control pattern.

In a similar manner, both the decoder units 3-2 and 3-3 include corresponding key decoders and alternate decoders and corresponding OR units. The decoder unit 3-2 provides the next N2 bits of the control pattern and the decoder unit 3-3 provides the last N3 bits of the control pattern. The N-bit control pattern on lines 14 is formed by the combination of the N1-bit, the N2-bit and the N3-bit outputs from the decoder units 3-1, 3-2 and 3-3, respectively. The sum of N1, N2 and N3 is equal to N.

When the value of N, representing the number of bits in the control pattern, is the same in FIG. 2 and in FIG. 5 the decoders in FIG. 5 can be somewhat simpler compared with the decoder required in FIG. 2. However, since the sum of M1, M2, and M3 in FIG. 5 is greater than M in FIG. 2, the FIG. 5 embodiment requires more storage bits to store the keys.

In FIG. 5, the external connector units 4-1, 4-2 and 4-3 serve the same function as the connector unit 4 in FIGS. 2 and 3. The use of multiple keys as indicated in the FIG. 5 embodiment provides additional flexibility in the microprograms stored in the memory 2 since a change in any one control field will not affect the other control fields.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In an integrated circuit, an apparatus connected to receive a sequence of multi-bit keys, for generating control patterns consisting of a plurality of control signals, comprising:

primary means, connected to receive the sequence of multi-bit keys, for detecting a primary set of the multi-bit keys, and for generating primary key decode signals corresponding to each of the multi-bit keys in the primary set;

alternate means, connected to receive the sequence of milti-bit keys, for detecting an alternate set of multi-bit keys, the alternate set having multi-bit keys not included in the primary set, and for generating alternate key decode signals corresponding to each of the multi-bit keys in the alternate set;

output means, connected to receive the alternate key decode signals from the alternate means, for supplying the alternate key code decode signals externally from the integrated circuit as output signals;

input means, connected to receive input signals externally supplied to the integrated circuit, for supplying the input signals internally to the integrated circuit; and a plurality of output gates for supplying the control signals, each output gate having a primary input connected to receive one of the primary key decode signals, an alternate input connected to receive one of the input signals from the input means and an output supplying one of the control signals;

the input means and output means being adapted for communication with connection means, external to the integrated circuit and responsive to the output signals, for supplying the input signals.

2. The apparatus of claim 1, further including:

combining means, in the integrated circuit connected to receive a subset of the alternate key decode signals from the alternate means, for generating combined alternate key decode signals for preselected combinations of alternate key decode signals, and means for supplying the combined alternate key decode signals to the output means; and wherein the output means includes means for supplying the combined alternate key decode signals externally from the integrated circuit as output signals.

3. The apparatus of claim 2, wherein the combining means comprises an array of OR-gates, each OR-gate in the array providing as an output signal one of the combined alternate key decode signals and having a plurality of inputs, each connected to receive one of the alternate key decode signals from the subset of the alternate key decode signals.

4. The apparatus of claim 1, wherein:

the output means includes a plurality of output paths, adapted to be connected to a wire external to the integrated circuit; and the input means includes a plurality of input paths, adapted to be connected to wire external to the integrated circuit, whereby the output means and input means are adapted to be selectively interconnected through the external connection means.

5. The apparatus of claim 1, wherein the multi-bit keys include M-bits, where M is an integer and the control patterns include N control signals, and M is less than N.

6. The apparatus of claim 1, wherein the output gates are OR-gates.

* * * * *